(12) United States Patent
Delst et al.

(10) Patent No.: US 11,079,525 B2
(45) Date of Patent: Aug. 3, 2021

(54) MATCHED INTERFERENCE PIGMENTS OR FOILS HAVING VIEWING ANGLE DEPENDENT MISMATCH

(71) Applicant: VIAVI Solutions Inc., San Jose, CA (US)

(72) Inventors: Cornelis Jan Delst, Fairfax, CA (US); Matthew R. Witzman, Windsor, CA (US); Paul T. Kohlmann, Windsor, CA (US); Charles T. Markantes, Santa Rosa, CA (US)

(73) Assignee: VIAVI Solutions Inc., San Jose, CA (US)

( * ) Notice: Subject to any disclaimer, the term of this patent is extended or adjusted under 35 U.S.C. 154(b) by 0 days.

(21) Appl. No.: 16/113,969

(22) Filed: Aug. 27, 2018

(65) Prior Publication Data

US 2019/0011618 A1 Jan. 10, 2019

Related U.S. Application Data

(63) Continuation of application No. 14/546,317, filed on Nov. 18, 2014, now Pat. No. 10,061,065.

(Continued)

(51) Int. Cl.
*B29C 70/58* (2006.01)
*C09C 1/00* (2006.01)
(Continued)

(52) U.S. Cl.
CPC .............. *G02B 5/288* (2013.01); *C09D 5/36* (2013.01); *G02B 5/22* (2013.01); *G02B 5/284* (2013.01);
(Continued)

(58) Field of Classification Search
CPC .. B29C 70/585; B42D 25/324; B42D 25/328; B42D 25/378–391; C01P 2006/60–66;
(Continued)

(56) References Cited

U.S. PATENT DOCUMENTS 3,123,489 A 3/1964 Bolomey et al.
3,374,105 A 3/1968 Bolomey
(Continued)

FOREIGN PATENT DOCUMENTS

CN 103206655 A 7/2013
CN 106199953 A 12/2016
(Continued)

OTHER PUBLICATIONS

European Search Report for EP Application No. 14193723 dated Mar. 12, 2015.
(Continued)

*Primary Examiner* — Ryan S Dunning
(74) *Attorney, Agent, or Firm* — Harrity & Harrity, LLP (57) ABSTRACT

A method of providing a configuration of a system of interference filters with a visible color shifting effect, includes: a hue matching step of identifying a configuration of a first interference filter including two first metal layers and a first spacer layer therebetween, and a configuration of a second interference filter including two second metal layers and a second spacer layer therebetween, wherein the first and second filters match in hue at the first viewing angle, and the mismatch in hue at the second angle; and a lightness adjustment step which may include modifying the layer material or the layer thickness of one of the metal layers; wherein a difference in lightness at the first viewing angle between the first and second modified filters is less that a difference in lightness at the first viewing angle between the first and second filters.

20 Claims, 6 Drawing Sheets

Related U.S. Application Data (60) Provisional application No. 61/905,741, filed on Nov. 18, 2013.

(51) Int. Cl.
*C09D 5/36* (2006.01)
*G02B 5/22* (2006.01)
*G02B 5/28* (2006.01)
*G02B 27/00* (2006.01)

(52) U.S. Cl.
CPC .............. *G02B 5/285* (2013.01); *G02B 5/286* (2013.01); *G02B 27/0012* (2013.01); *B29C 70/585* (2013.01); *C01P 2006/62* (2013.01); *C09C 1/0015* (2013.01); *C09C 2200/1054* (2013.01); *C09C 2200/24* (2013.01); *C09C 2220/20* (2013.01)

(58) Field of Classification Search
CPC ... C09C 1/0015; C09C 1/0021; C09C 1/0024; C09C 1/003; C09C 1/0033; C09C 1/0051; C09C 1/0057; C09C 1/006; C09C 2200/1054; C09C 2200/24; C09D 5/36; G02B 5/22; G02B 5/28; G02B 5/284; G02B 5/285; G02B 5/286; G02B 5/287; G02B 5/288; G02B 27/0012
USPC ............ 252/586; 283/91, 114; 359/584–586, 359/588–590, 885; 428/357, 402, 606, 428/607
See application file for complete search history.

(56) References Cited

U.S. PATENT DOCUMENTS

| | | | |
|---|---|---|---|
| 3,858,977 A | 1/1975 | Baird et al. | |
| 4,168,986 A | 9/1979 | Venis et al. | |
| 4,434,010 A | 2/1984 | Ash | |
| 4,534,398 A | 8/1985 | Crane | |
| 4,626,445 A | 12/1986 | Dobrowolski et al. | |
| 4,705,356 A | 11/1987 | Berning et al. | |
| 4,838,648 A | 6/1989 | Phillips et al. | |
| 4,930,866 A | 6/1990 | Berning et al. | |
| 5,009,486 A | 4/1991 | Dobrowolski et al. | |
| 5,059,245 A | 10/1991 | Phillips et al. | |
| 5,087,507 A | 2/1992 | Heinzer | |
| 5,135,812 A | 8/1992 | Phillips et al. | |
| 5,214,530 A | 5/1993 | Coombs et al. | |
| 5,248,544 A | 9/1993 | Kaule | |
| 5,571,624 A | 11/1996 | Phillips et al. | |
| 5,766,738 A | 6/1998 | Phillips et al. | |
| 6,114,018 A | 9/2000 | Phillips | |
| 6,236,510 B1 | 5/2001 | Bradley, Jr. et al. | |
| 6,376,018 B1 | 4/2002 | Kittler, Jr. | |
| 6,472,455 B1 | 10/2002 | Bleikolm et al. | |
| 6,586,098 B1 | 7/2003 | Coulter et al. | |
| 6,650,478 B1 | 11/2003 | DeBusk | |
| 6,815,065 B2 | 11/2004 | Argoitia et al. | |
| 6,838,166 B2 | 1/2005 | Phillips et al. | |
| 6,997,981 B1 | 2/2006 | Coombs et al. | |
| 7,258,915 B2 | 8/2007 | Argoitia et al. | |
| 7,550,197 B2 | 6/2009 | Kittler, Jr. et al. | |
| 8,642,161 B2 | 2/2014 | Kuntz et al. | |
| 10,061,065 B2 | 8/2018 | Delst et al. | |
| 2003/0129404 A1* | 7/2003 | Argoitia ............... | C09C 1/0015 428/403 |
| 2003/0190473 A1 | 10/2003 | Argoitia | |
| 2003/0203222 A1* | 10/2003 | Phillips .................... | C09D 5/36 428/472 |
| 2004/0028905 A1 | 2/2004 | Phillips et al. | |
| 2008/0031508 A1* | 2/2008 | Baloukas ............... | G02B 5/285 382/137 |
| 2009/0258301 A1 | 10/2009 | Kothari et al. | |
| 2011/0215562 A1 | 9/2011 | Bleikolm et al. | |
| 2012/0170124 A1 | 7/2012 | Fushe et al. | |
| 2014/0126765 A1 | 5/2014 | Tierney | |
| 2019/0153233 A1* | 5/2019 | Delst .................... | C09C 1/0057 |

FOREIGN PATENT DOCUMENTS

| | | |
|---|---|---|
| DE | 10-2009-041583 | 3/2011 |
| EP | 317514 | 5/1989 |
| EP | 383376 | 8/1990 |
| EP | 435029 | 7/1991 |
| EP | 490825 | 6/1992 |
| EP | 657297 | 6/1995 |
| EP | 0914261 | 12/2004 |
| EP | 2230539 | 9/2010 |

OTHER PUBLICATIONS

Scanned Printout of front side of a 500 DM bank note and a 1000 DM bank note—Oct. 27, 1992.
http://www.bundesbank.de/bargeId/bargeId _ faq_ dmbanknoteab-bildungen.php—Oct. 27, 1992.
"Helping make packaging Irresistible" BASF 2007.
www.print-mediaacademy .com/www/html/de/content/articles/print _buyer services/passion_for_Print _lips?mode=printable from Heidelberg Druckmaschinen AG—Submitted to EPO Mar. 2009.
Phiillips "Optically variable films, pigments and inks", Proc. SPIE, vol. 1323, 98 (1990).
Extended European Search Report for Application No. EP19179983, dated Sep. 17, 2019, 11 pages.

* cited by examiner

| Design | L* | a* | b* | Hue | C* |
|---|---|---|---|---|---|
| A | 74.4 | -61.1 | 32.7 | 151.8 | 69.4 |
| B | 73.8 | -61.1 | 32.4 | 152.0 | 69.2 |

FIG. 8

MATCHED INTERFERENCE PIGMENTS OR FOILS HAVING VIEWING ANGLE DEPENDENT MISMATCH

CROSS-REFERENCE TO RELATED APPLICATIONS

This application is a continuation of U.S. patent application Ser. No. 14/546,317, filed Nov. 18, 2014 (now U.S. Pat. No. 10,061,065), which claims priority from U.S. Provisional Patent Application No. 61/905,741, filed Nov. 18, 2013, the disclosures of which are incorporated herein by reference.

TECHNICAL FIELD

The present disclosure relates to interference pigments and foils and, more particularly, to designing, manufacturing and using paired interference pigments or foils.

BACKGROUND

Interference pigment flakes and foils have been developed for a wide variety of applications such as decorative cookware, creating patterned surfaces, and security devices. Similarly, color shifting pigments have been developed for such uses as cosmetics, inks, coating materials, ornaments, ceramics, automobile paints, anti-counterfeiting hot stamps, and anti-counterfeiting inks for security documents and currency.

Color shifting pigments and foils exhibit the property of changing color upon variation of the angle of incident light, or as the viewing angle of the observer is shifted. The color shifting properties of pigments and foils can be controlled through proper design of the optical thin films or orientation of the molecular species used to form the flake or foil coating structure. Desired effects can be achieved through the variation of parameters such as thickness of the layers forming the flakes and foils and the index of refraction of each layer.

The changes in perceived color which occur for different viewing angles or angles of incident light are a result of a combination of selective absorption of the materials including the layers and wavelength dependent interference effects. The interference effects, which arise from the superposition of light waves that have undergone multiple reflections, are responsible for the shifts in color perceived with different angles. The reflection maxima changes in position and intensity, as the viewing angle changes, due to changing interference effects arising from light path length differences in the various layers of a material which are selectively enhanced at particular wavelengths.

Color shifting pigments and foils may include multilayer interference filters formed of thin film layers, each including one or more absorber layers and dielectric layers also referred to as spacer layers, and optionally one or more reflector layers, in varying layer orders.

Color shifting pigments and foils may have a symmetrical multilayer thin film structure, such as: absorber/dielectric/reflector/dielectric/absorber; or absorber/dielectric/absorber. Alternatively, foils and pigments may have an asymmetrical multilayer thin film structure, such as: absorber/dielectric/reflector.

A color shifting foil including the multilayer thin film structure may be formed by deposition of the layers onto a flexible substrate, e.g. PET web, by methods well known in the art of forming thin film coatings, such as PVD, sputtering, or the like.

The multilayer thin film structure may also be formed on a web coated with a release layer, and then removed from the web material and broken into color shifting flakes, which can be added to a polymeric medium such as various pigment vehicles for use as an ink or paint. Various thin-film flakes and methods of manufacturing such flakes are disclosed e.g. in U.S. Pat. Nos. 4,838,648, 7,258,915, 6,838,166, 6,586,098, 6,815,065, 6,376,018, 7,550,197, 4,705,356, 5,135,812, 5,571,624, all of which are incorporated herein by reference.

To enhance the counterfeit resistance and the ease of visual authentication of documents protected by optically variable security elements, it has been proposed to use paired color shifting structures which exhibit a same color at one viewing angle, and different colors—at a second viewing angle. In such a device, a uniformly colored image may explode in two or more colors when tilted. U.S. Pat. Nos. 5,766,738, 6,114,018, and 6,472,455, which are incorporated herein by reference, disclose paired structures. By way of example, two types of pigment flakes may be used for making two ink coatings matching in color at one angle and exhibiting different colors at another angle. The both types of flakes have the absorber/dielectric/reflector/dielectric/absorber design, however differ in the thickness of the dielectric layer.

The difference in color may be quantified by using color coordinates, e.g., in terms of C* (chroma), h (hue), and L* (lightness). One method of designing paired optical structures is using a quarter-wave or half-wave design, wherein thicknesses of the dielectric layers are different multiples of a quartet-wave or a half-wave thickness based on selected design wavelengths. Some known methods for designing paired interference structures concentrate on matching in true at a particular angle. Paired pigments are considered to be matching at a certain angle even when they mismatch in chroma and/or lightness. It has been suggested to minimize variations in lightness and chroma by adding a black or neutral transparent pigment to one of the inks. However, depending on the printing method, such additions could affect the print quality. In view of the foregoing, it may be understood that there are significant problems and shortcomings associated with current solutions and technologies for providing paired interference structures that match in hue, chroma, and lightness at a particular angle of observation md mismatch at another angle.

SUMMARY

A method of designing a system of interference filters which includes a plurality of interference filters, each for providing a visible color shifting effect when tilted between first and second viewing angles in the presence of incident light, includes the following steps:

a hue matching step which includes identifying layer materials and layer thicknesses for a design of a first interference filter including two first metal layers and a first spacer layer therebetween, and for a design of a second interference filter including two second metal layers and a second spacer layer therebetween, wherein the layer materials and layer thicknesses are such that an optical thickness of the first spacer layer is different from an optical thickness of the second spacer layer, and wherein the first and second interference filters match in hue at the first viewing angle, and the first and second interference filters mismatch in hue at the second viewing angle; and a lightness adjustment step which includes modifying the design of the first initial interference filter or the design of the second initial interference filter, wherein the designs of the initial filters are identified in hue matching step, so as to obtain designs of first and second modified interference filters, including modifying the layer material or the layer thickness of one of the first or second metal layers, or modifying the first or second spacer layers by including an absorber layer therewithin; wherein a difference in lightness at the first viewing angle between the first and second modified filters is less than a difference in lightness at the first viewing angle between the first and second filters.

The resulting design of the system of interference filters includes the designs of the first and second modified interference filters.

The method may be used for designing a system of interference filters each having a reflector/dielectric/absorber design for providing a visible color shilling effect when tilted between first and second viewing angles in the presence of incident light. The method then includes the following steps:

(a) identifying layer materials and layer thicknesses for a design of a first interference filter, which includes a first reflector layer, a first absorber layer, and a first spacer layer between the first reflector layer and the first absorber layer, and for a design of a second interference filter, which includes a second reflector layer, a second absorber layer, and a second spacer layer between the second reflector layer and the second absorber layer, wherein the layer materials and layer thicknesses are such that an optical thickness of the first spacer layer is different from an optical thickness of the second spacer layer, and where the first and second interference filters match in hue at the first viewing angle, and the first and second interference filters mismatch in hue at the second viewing angle;

(b) modifying the design of the first interference filter or the design of the second interference filter so as to obtain designs of first and second modified interference filters; step (b) includes modifying the layer material or the layer thickness of the first or second absorber layer or of the first or second reflector layer, or modifying the first or second spacer layer by including an additional absorber layer therewithin, wherein a difference in lightness at the first viewing angle between the first and second modified filters is less that a difference in lightness at the first viewing angle between the first and second filters. The resisting design of the system includes the designs of the first and second modified interference filters.

Another aspect of the disclosure relates to a system of interference filters, each for providing a color shifting effect when tilted between first and second viewing angles in the presence of incident light. The system includes a first interference filter including a first reflector layer, a first absorber layer of light-absorber material and having a thickness H1, and a first spacer layer between the first reflector layer and the first absorber layer; and, a second interference filter including a second reflector layer, a second absorber layer formed of the light-absorber material and having a thickness H2 different from H1, and a second spacer layer between the second reflector layer and the second absorber layer, wherein an optical thickness of the second spacer layer is different from an optical thickness of the first spacer layer, wherein the first and second interference filters match in hue, chroma, and lightness at the first viewing angle, and mismatch in hue at the second viewing angle. A difference in color between the first and second interference filters at the first viewing angle is less than a difference in color at the first viewing angle between two interference filters forming a first comparison pair, different from the first and second interference filters only in that absorber layers in the two interference filters of the first comparison pair have the thickness H1, and is less than a difference in color at the first viewing angle between two interference filters forming a second comparison pair, different from the first and second interference filters only in that absorber layers in the two interference filters of the second comparison pair have the thickness H2.

BRIEF DESCRIPTION OF THE DRAWINGS

In order to facilitate a fuller understanding of the exemplary embodiments, reference is now made to the appended drawings, in which like elements are referenced with like numerals. These drawings should not be construed as limiting the present disclosure, but are intended to be illustrative only.

DETAILED DESCRIPTION

Intaglio printing is used for making bank notes and other documents, and often intaglio inks include color shifting pigments. In order to increase the counterfeit resistance of the documents, paired color shifting pigments may be used in intaglio printing. Images printed next to each other with inks containing paired color shifting pigments match color in a small range of viewing angles and have different colors at other viewing angles. Counterfeiters are less likely to have access to a set of pigments with these specific properties, targeted to this specific use, than to a single color shifting pigment.

The color shifting pigments for use in intaglio inks may be symmetric interference flakes with a central reflector layer, two dielectric layers on the sides of the reflector layer, and two absorbers on the dielectric layers. Such pigment flakes may be seen as two interference filters joined back-to-back so as to produce same optical effects on both sides of the flake. The layer thicknesses and layer materials may be selected to achieve a desired effect. The design parameters for paired pigments are selected so that the paired pigments, and thus paired inks, match in color at one viewing angle and mismatch at a different viewing angle.

The method disclosed herein allows to design a system of interference filters. The system includes at least first and second interference filters, each providing a color shifting effect when tilted between first and second viewing angles in the presence of incident light. Each of the filters may have a reflector layer, an absorber layer, and a dielectric layer between the first reflector layer and the first absorber layer; the dielectric layer is also referred to as a spacer layer. The design method includes identifying materials and thicknesses of the layers so that the filters, and devices manufactured including such filters, perform as desired.

Figure 1:
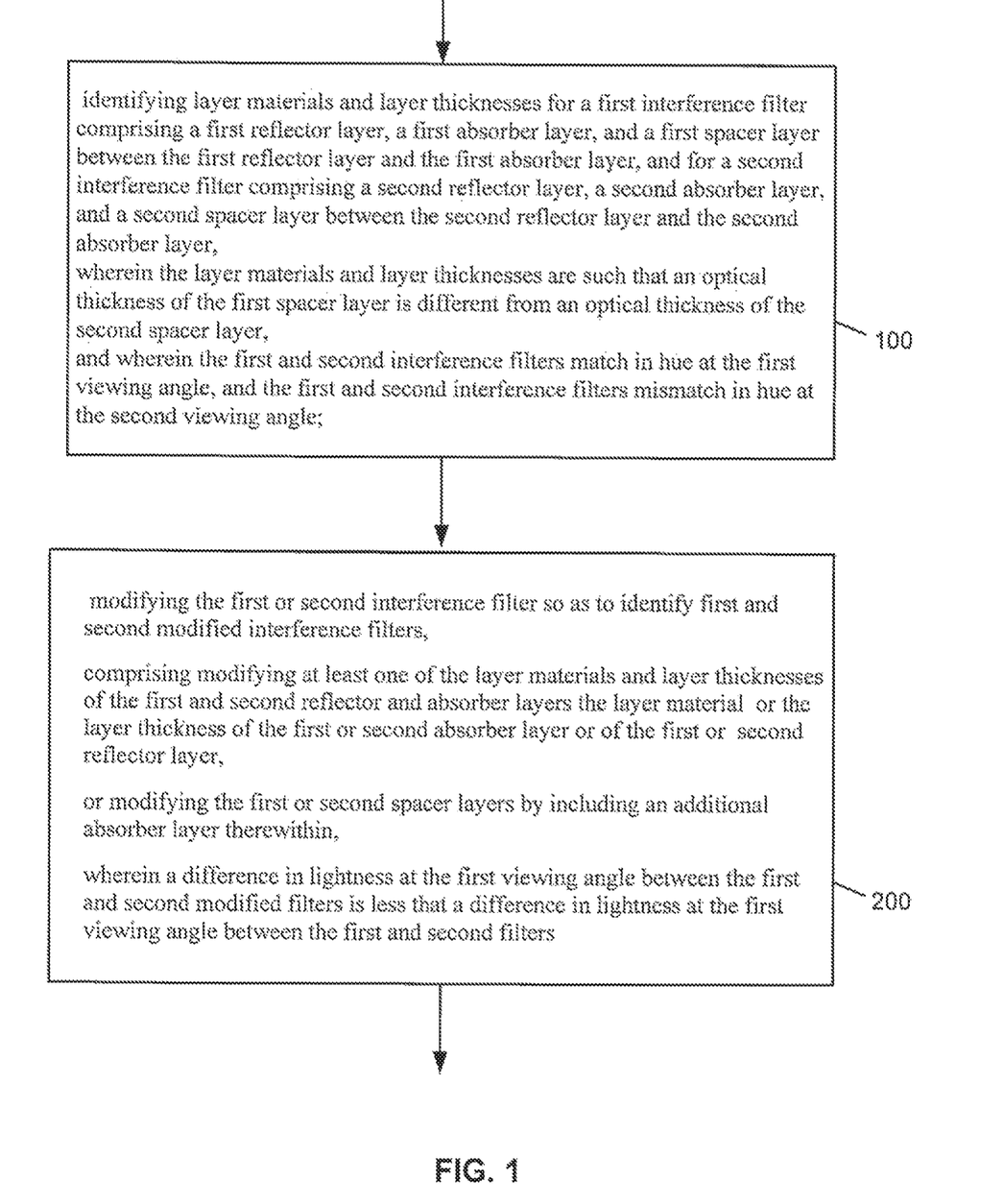
FIG. 1 is a flowchart of the method of designing a system of interference filters.

With reference to FIG. 1, the method of designing the system of interference filters includes two steps: a hue matching step 100, and a lightness adjustment step 200.

Figure 2:
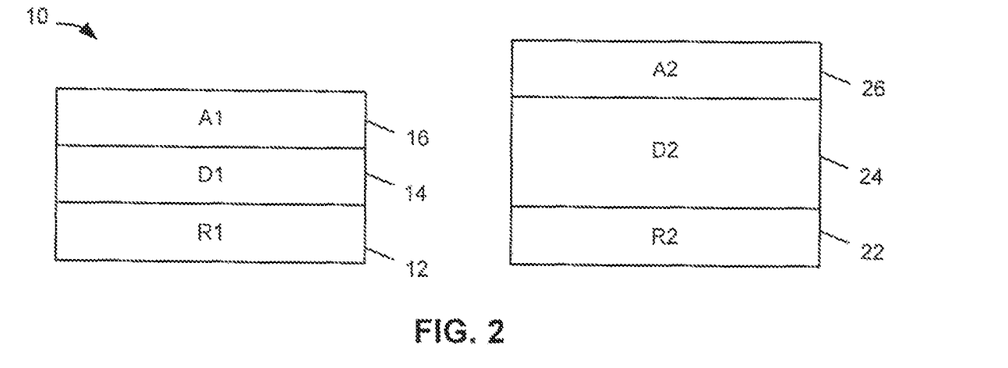
FIG. 2 is a schematic illustration of two interference filter designs identified in the hue matching step of the method.

The hue matching step 100 includes identifying layer materials and layer thicknesses in designs of two paired interference filters 10 and 20 illustrated in FIG. 2. The layer materials and layer thicknesses in the design of the filters 10 and 20 are such that the filters, after manufacture, have the following optical properties: each of the filters 10 and 20 is capable of producing a visible color shifting optical effect, the first and second interference filters 10 and 20 match in hue at the first viewing angle, and the first and second interference filters 10 and 20 mismatch in hue at the second viewing angle. In other words, at the first angle of observation, the first and second filters appear to a human eye as having a same color; at the second angle of observation, the two filters appear to have colors different from each other and from the color observed at the first viewing angle. The first angle is different from the second viewing angle, with the difference preferably be greater than 10 degrees. When the two interference filters border without significant demarcation, the match in color means dE<6; when there is a distance and/or demarcation that makes comparison more difficult, a functional color match is dE<12.

A configuration, also referred to as a design, of an interference filter is the parameters required to manufacture the filter, and includes the order of layers, their materials, and thicknesses. With reference to FIG. 2, the design of the first interference filter 10 includes a first reflector layer 12, a first absorber layer 16, and a first spacer layer 14 between the first reflector layer 12 and the first absorber layer 16. The design of the second interference filter 20 has a second reflector layer 22, a second absorber layer 26, and a second spacer layer 24 between the second reflector layer 22 and the second absorber layer 26.

The first and second reflector layers 12 and 22 may be metal layers. Non-limiting examples of suitable metallic materials for the reflector layers include aluminum, silver, copper, gold, platinum, tin, titanium, palladium, nickel, cobalt, rhodium, niobium, chromium, and combinations or alloys thereof. Preferably, the thicknesses of the reflector layers 12 and 22 are sufficient for making the layers opaque. The reflector layers 12 and 22 may be formed to have a suitable physical thickness of from about 40 to about 2,000 nm, and preferably from about 60 to about 1,000 nm. The reflector layers may have a reflectivity of at least 40% and preferably higher than 60%.

In order for the two interference filters 10 and 20 to match in hue at the first viewing angle, the reflector layers 12 and 22 are preferably opaque layers made of a same material. The thicknesses of the reflector layers 12 and 22 may be same in order to make manufacturing of resulting devices more convenient.

The first and second absorber layers 16 and 26 are partially absorbing, partially light transmitting layers, possibly metal layers with the thickness in the range of from 5 to 15 nm.

Non-limiting examples of suitable light-absorber materials include metallic absorbers such as chromium, aluminium, nickel, silver, copper, palladium, platinum, titanium, vanadium, cobalt, iron, tin, tungsten, molybdenum, rhodium, and niobium, as well as their corresponding oxides, sulfides, and carbides. Other suitable light-absorber materials include carbon, graphite, silicon, germanium, cermet, ferric oxide or other metal oxides, metals mixed in a dielectric matrix, and other substances that are capable of acting as a uniform or selective absorber in the visible spectrum. Various combinations, mixtures, compounds, or alloys of the above absorber materials may be used to form the absorber layers 16 and 26.

Examples of suitable alloys of the above absorber materials include Inconel (NiCr—Fe), stainless steels, Hastalloys (e.g., Ni—Mo—Fe; Ni—Mo—Fe—Cr; Ni—Si—Cu) and titanium-based alloys, such as titanium mixed with carbon (Ti/C), titanium mixed with tungsten (Ti/W), titanium mixed with niobium (Ti/Nb), and titanium mixed with silicon (Ti/Si), and combinations thereof. As mentioned above, the absorber layers can also be composed of an absorbing metal oxide, metal sulfide, metal carbide, or combinations thereof. For example, one preferred absorbing sulfide material is silver sulfide. Other examples of suitable compounds for the absorber layers include titanium-based compounds such as titanium nitride (TiN), titanium oxynitride (TiNxOy), titanium carbide (TiC), titanium nitride carbide (TiNxCz), titanium oxynitride carbide (TiNxOyCz), titanium silicide (TiSi2), titanium boride (TiB2), and combinations thereof. In the case of TiNxOy and TiNxOyCz, preferably x=0, to 1, y=0 to 1, and z=0 to 1, where x+y=1 in TiNxOy and x+y+z=1 in TiNxOyCz. For TiNxCy, preferably x=0 to 1 and z=0 to 1, where x+z=1. Alternatively, the absorber layers can be composed of a titanium-based alloy disposed in a matrix of Ti, or can be composed of Ti disposed in a matrix of a titanium-based alloy.

The first absorber layer 16 may be made of a same material and have a same thickness as the second absorber layer 26.

The dielectric layers 14 and 24 act as spacers in the thin film stack structure. These layers are formed to have an effective optical thickness for imparting interference color and desired color shifting properties. The dielectric layers may be optionally clear, or may be selectively absorbing so as to contribute to the color effect of a pigment. The optical layer is a well known optical parameter defined as the product $\eta d$, where $\eta$ is the refractive index of the layer and d is the physical thickness of the layer. Typically, the optical thickness of a layer is expressed in terms of a quarter wave optical thickness (QWOT). The QWOT condition occurs when $\eta d = \lambda/4$, and $\lambda$ is the wavelength where optical interference occurs. The optical thickness of dielectric layers can range from about 2 QWOT at a design wavelength of about 400 nm to about 9 QWOT at a design wavelength of about 700 nm, ad preferably 2, 4, or 6 QWOT at a design wavelength in the range of 400-700 nm, depending upon the color shift desired. The dielectric layers typically have a physical thickness of about 100 nm to about 800 nm, depending on the color characteristics desired.

Suitable materials for dielectric layers 14 and 24 include those having a "high" index of refraction, defined herein as greater than about 1.65, as well as those have a "low" index of refraction, which is defined herein as about 1.65 or less.

Each of the dielectric layers can be formed of a single material or with a variety of material combinations. For example, the dielectric layers can be formed of only a low index material or only a high index material, a mixture or multiple sublayers of two or more low index materials, a mixture or multiple sublayers of two or more high index materials, or a mixture or multiple sublayers of low index and high index materials. In addition, the dielectric layers can be formed partially or entirely of high/low dielectric optical stacks, which are discussed in further detail below. When a dielectric layer is formed partially with a dielectric optical stack, the remaining portion of the dielectric layer can be formed with a single material or various material combinations as described above.

Examples of suitable high refractive index materials for the dielectric layer include zinc sulfide (ZnS), zinc oxide (ZnO), zirconium oxide (ZrO2), titanium dioxide (TiO2), diamond-like carbon, indium oxide (In2 O3), indium-tin-oxide (ITO), tantalum pentoxide (Ta2 O5), ceric oxide (CeO2), yttrium oxide (Y2 O2), europium oxide (Eu2 O3), iron oxides such as (II)diiron(III) oxide (Fe3 O4) and ferric oxide (Fe2 O3), hafnium nitride (HfN), hafnium carbide (HfC), hafnium oxide (HfO2), lanthanum oxide (La2 O3), magnesium oxide (MgO), neodymium oxide (Nd O), praseodymium oxide (Pr6 O11), samarium oxide (Sm2 O3), antimony trioxide (Sb2 O3), silicon monoxide (SiO), selenium trioxide (Se2 O3), tin oxide (SnO2), tungsten trioxide (WO3), combinations thereof, and the like.

Suitable low refractive index materials for the dielectric layer include silicon dioxide (SiO2), aluminum oxide (Al2 O3), metal fluorides such as magnesium fluoride (MgF2), aluminum fluoride (AlF3), cerium fluoride (CeF3), lanthanum fluoride (LaF3), sodium aluminum fluorides (e.g., Na3 AlF6 or Na5 Al3 Fl4), neodymium fluoride (NdF3), samarium fluoride (SmF3), barium fluoride (BaF2), calcium fluoride (CaF2), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), perfluoroalkenes, polytetrafluoroethylene (Teflon), fluorinated ethylene propylene (FEP), combinations thereof, and the like.

The layer materials and layer thicknesses of the spacer layers 14 and 24 are such that the optical thickness of the first spacer layer 14 is different from the optical thickness of the second spacer layer 24, so as to ensure that the color shifting effects are different from one another.

In case the optical thicknesses of the spacer layers are 2, 4, or 6 QWOT, the first and second interference filters would match in hue at the first viewing angle, which in this case is the normal to the surface of the filter. However, the lightness and chromaticity of light reflected from the first and second interference filters 10 and 20 at the first (hue matching) angle do not necessarily match.

The interference filters 10 and 20 are not necessarily manufactured; the optical performance of the interference filters may be evaluated using software simulation, e.g. using commercially available optical design software. In other words, the expression "interference filter" refers to a design which may be implemented in a physical device. The reference to modifying a filter is understood herein as changing parameters in the filter design, so that the final set of layer materials and thicknesses may be used for manufacturing a device including an interference filter as designed by the method disclosed herein.

The matching conditions are achieved if the difference in hue is less than 10 degrees and preferably less than 5 degrees and the difference in chroma is less than 20 units and preferably less than 10 units, and the difference in lightness is less than 30 and preferably less than 15 (measured in full hiding mass tone and as per 1976 CieLab color system).

The mismatch conditions are achieved if the difference in hue is greater than 10 degrees and preferably greater than 15 degree and/or the difference in chroma is greater than 20 units and preferably greater than 30 units (measured in full hiding mass tone and as per 1976 CieLab color system).

In the L*, a*, b* (CIELAB) color space, the color of any optically variable device can be characterized by the three tristimulus values, X, Y and Z. These tristimulus values take into account the spectral distribution of the light source, the reflectance of the optically variable pigment and the spectral sensitivity to the human eye. It is from these X, Y and Z values that the L*, a*, b* coordinates are calculated as are the related values of L* (lightness), C* (chroma), h (hue) and associated color differences i.e. delta L*, delta C* and delta h.

Alternatively, the materials and thicknesses in the designs for the paired interference filters 10 and 20 may be selected so that in the a* b* diagrams of the filters there are crossover points at which the interference filters will have the same hue and chroma as disclosed in U.S. Pat. No. 6,114,018.

Figure 5:
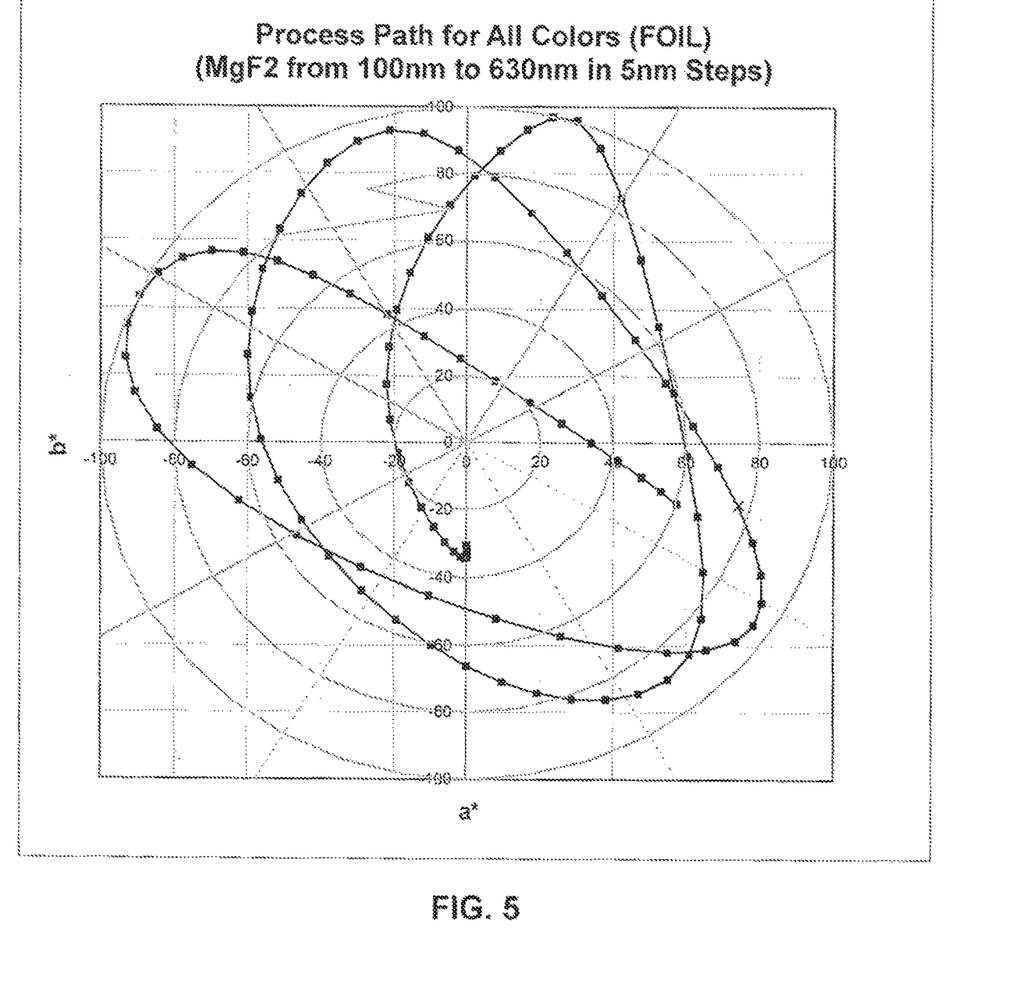
FIG. 5 is a plot of optical characteristics (a* and b*) of light reflected from an interference filter at an angle close to the normal angle, dependent on the thickness of the spacer layer in the filter.
Figure 6:
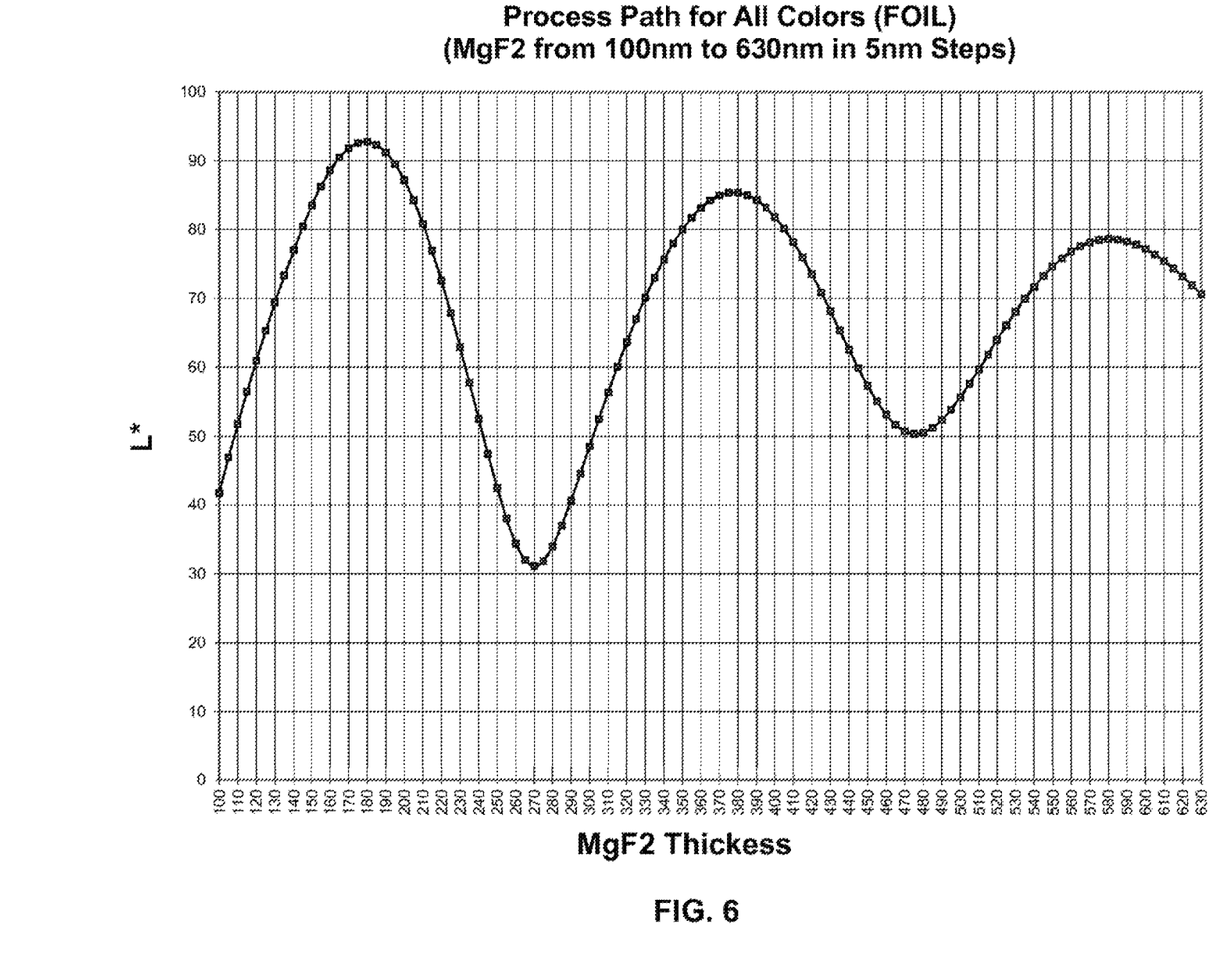
FIG. 6 is a plot of lightness (L*) dependent on the thickness of the spacer layer.

The example graphs in FIGS. 5 and 6 show a*, b* and L* with a fixed absorber thickness for a theoretic Al reflector, MgF2 and Cr. Other materials may result in different values, this material set is just an example. It may be seen from this graph that significantly different dielectric thicknesses can result in identical hue angles and in some specific cases even an identical chromaticity. A lookup of specific matching configurations in the second graph however shows that the lightness will not match without further design adjustments.

However, if two devices manufactured or simulated in accordance with the interference filter designs 10 and 20 match in hue, or in hue in chroma, as discussed above, the devices still may be perceived as different in color due to the difference in lightness. In many cases a three-fold match (chroma, hue, lightness) cannot be achieved without compromising on chroma. Assume two pigments that match chroma and hue and have a different lightness with the absorbers both optimized for chroma. Lowering the lightness on the lightest on will lower chroma as well and that now no longer matches chroma of the darker pigment. The best compromise is lightening the absorber in the darter pigment, sacrificing some chroma on each, to reach the point where the light pigment is now darker, the dark pigment is now lighter and at point with a chroma match where chroma is lower than at the starting point for both.

The lightness adjustment step 200 (FIG. 1) modifies the design of the interference filter 10 and/or the design of the interference filter 30 so as to identify designs of first and second modified interference filters. The modification is intended to reduce the lightness difference between the two filters. In other words, the lightness values at the first (hue matching) viewing angle of the modified filters are closer than the lightness values at the first viewing angle of the first and second interference filters 10 and 20. The lightness adjustment step 200 identifies designs (layer materials and layer thicknesses) of the first and second modified interference filters the designs are such that the modified interference filters match in lightness and also match in hue as the interference filters 10 and 20 before the modification.

Figure 3:
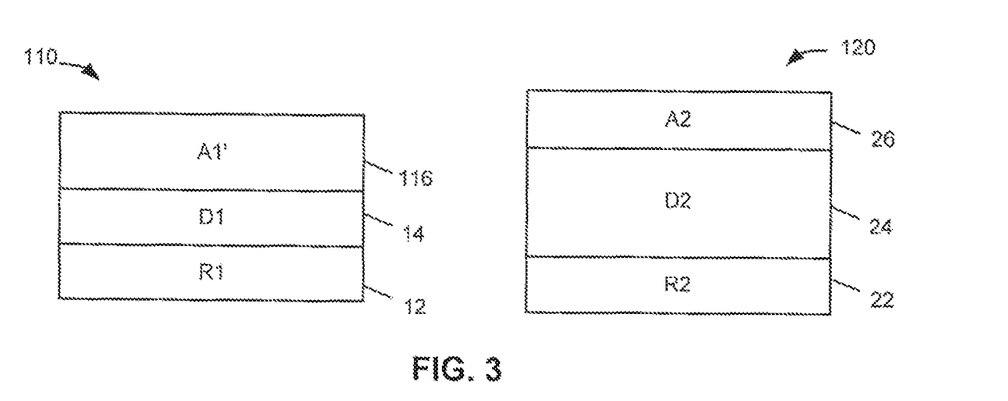
FIG. 3 is a schematic illustration of two modified interference filter designs identified in the lightness adjustment step of the method.

The modification of the two interference filter designs may change one or more of the layer materials and layer thicknesses identified in the hue matching step 100. Preferably, the lightness adjustment step 200 includes modifying the layer material or the layer thickness of the first absorber layer 16 or of the second absorber layer 26. FIG. 3 shows the first modified interference filter 110 with a modified absorber layer 116, whereas the reflector layer 12 and the dielectric layer 14 have not been modified. Although a different light-absorber material may be used, it is preferable to change the thickness of the absorber layer, so that the modified absorber layer 116 is formed of a same material identified for the first absorber layer 16, however, the thickness of the modified absorber layer 116 is different from the thickness of the first absorber layer 16.

Although the lightness adjustment step 200 may include modifying both, the first and second, interference filters 10 and 20, usually the difference in lightness may be sufficiently adjusted by modifying only one of the interference filter designs 10 or 20. Accordingly, for the purpose of illustration, FIG. 3 shows the modified interference filter design 120 same as the design of the interference filter 20 identified in the hue matching step 100.

The lightness adjustment step 200 may include modifying the layer material or the layer thickness of the first reflector layer 12 or of the second reflector layer 22.

Figure 4:
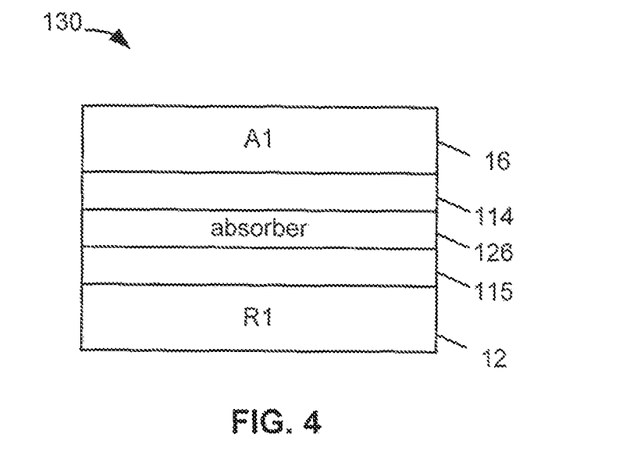
FIG. 4 is a schematic illustration of a modified interference filter design identified in the lightness adjustment step of the method.

It is also possible to match the lightness of two interference filters by including an additional reflector layer therewithin. With reference to FIG. 4, the design of a modified interference filter 130 is obtained by dissecting the dielectric layer 14 of the interference filter design 10 into two dielectric portions 114 and 115 and including an additional absorber layer 126 therebetween. As in the embodiment illustrated in FIG. 3, the second modified design of interference filter may have the same design 20 identified the hue matching step 100.

The design method allows identifying two designs in the hue matching steps 100, wherein the interference filters built or simulated in accordance with the designs 10 and 20 match in hue and possibly in chroma at the first viewing angle. In the lightness matching step 200, the designs 10 and 20 are modified so as to achieve or improve the match in lightness, so that a difference in lightness at the first viewing angle between the first and second modified filters is less that a difference in lightness at the first viewing angle between the first and second filters identified the hue matching step 100, whereas the first and second modified designs still mismatch in hue at the second viewing angle. The resulting modified designs may be used for manufacturing a system of two interference foils or two pluralities of pigment flakes, wherein the layers in the foils or flakes have the same materials and thicknesses as in the modified interference filters identified in the lightness adjustment step 200.

Although the lightness adjustment step 200 is intended to maintain the hue match at the first viewing angle and hue mismatch at the second viewing angle, it should be understood that absorbers and reflectors are never completely spectrally neutral. That means an adjustment for lightness with these layers may result in a slight hue angle change. Thus, maintaining the hue match and mismatch should be understood so that the difference in hue between the first and second modified interference filters may change in value but still satisfies the match and mismatch conditions defined above.

The increase in hue difference resulted from the lightness adjustment step 200 may be corrected with a slight dielectric thickness change without significantly impacting color contrast at non matching angles so as to design a system of further modified filters that may be used for manufacturing of paired foils or pigments, or by adding small amounts of colorants in the ink or paint vehicle that contains the pigment.

Figure 8:
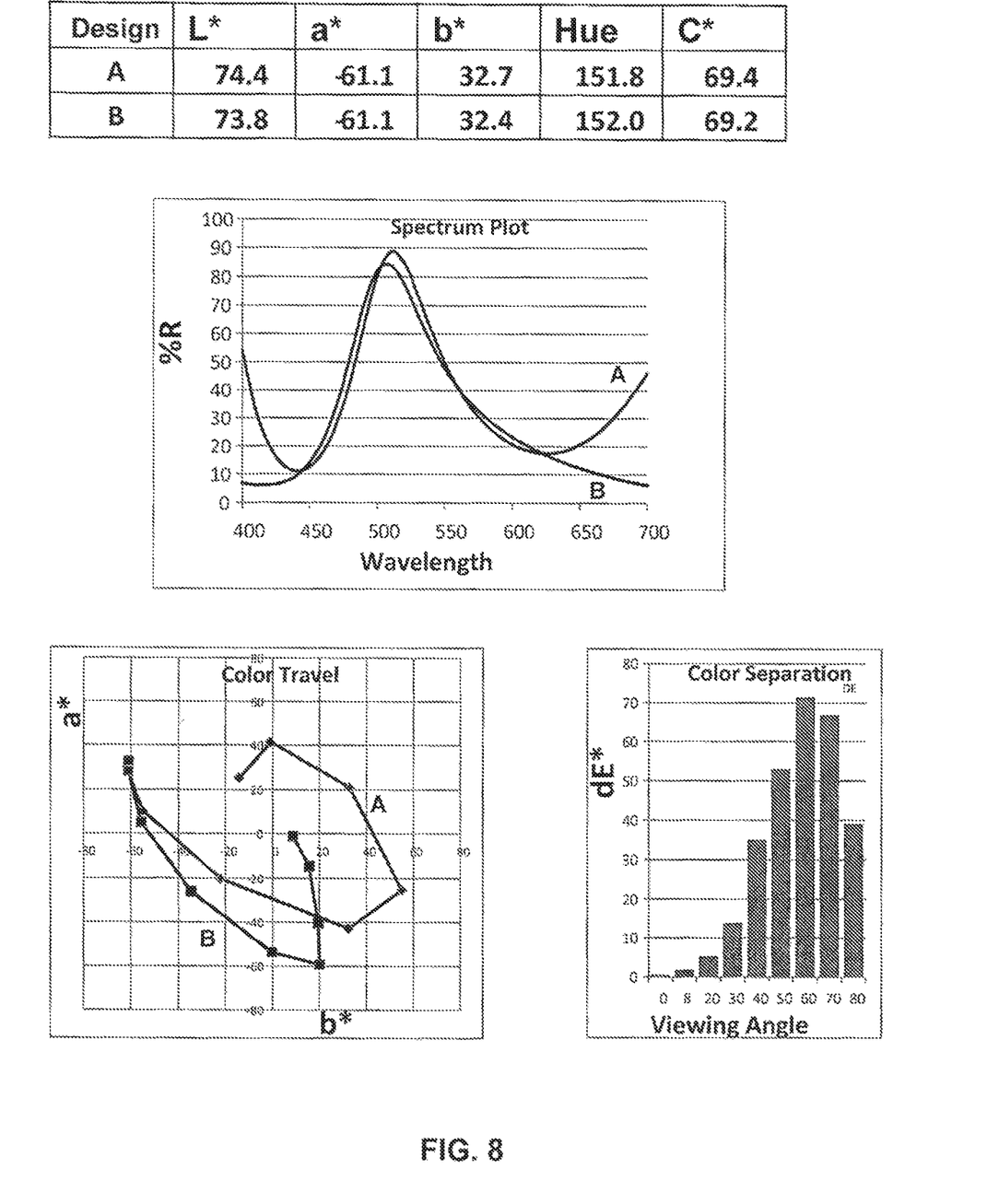

By way of example, FIG. 8 illustrates pigment designs obtained by the method disclosed herein. With reference to FIG. 8, the hue matching step 100 resulted in five-layer interference pigment designs with 4 QWOT and 6 QWOT spacer layers, formed of MgF2 and having physical thicknesses 360 nm and 540 nm, respectively. In the lightness adjustment step 200, the lightness values of the two interference filters were brought together by using absorber layers with different thicknesses, 3.5 nm in the design A, and 9 nm—in the design B. Further correction of the hue values caused slight decrease in the values of the dielectric spacer layers in the design B. The resulting designs may be described by the following formulae:

Design A: Cr (3.5 nm)/MgF2 (540 nm)/Al (60 nm)/MgF2 (540 nm)/Cr (3.5 nm).

Design B: Cr (9 nm)/MgF2 (342 nm)/Al (60 nm)/MgF2 (353 nm)/Cr (9 nm).

At the normal viewing angle, the two designs match in hue, chroma, and lightness, with the difference in color dE* of only 0.65.

The design method may be performed using a specialized software for simulation of optical performance of interference filters. Preferably, the method is performed on a general purpose or specialized computer having a memory and a processor for executing the software; the resulting system design may be outputted to a user or to a manufacturing system, for a further use in manufacturing of articles including paired interference filters.

The color match for interference filters may be influenced by the light spectrum used for illumination. Accordingly, the hue match and mismatch in the hue matching step 100, and the lightness values in the lightness adjustment step 200 may be measured or simulated at same light conditions, possibly in daylight, or in incandescent, or in fluorescent light. Color match needs to be designed for one specific light type/temperature, or as a deliberate compromise to work to a degree in different light types.

In one embodiment of the method, in the hue matching step 100, the identified design parameters (thicknesses and materials) are such that the first and second interference filters match in hue at the first viewing angle and mismatch in hue at the second viewing angle in same light conditions. And in the lightness adjustment step 200, the difference in lightness at the first viewing angle between the first and second modified interference filters and the difference in lightness at the first viewing angle between the first and second initial filters are identified at the same light conditions. The light conditions may be daylight conditions.

The light conditions used in designing the interference filters may be predefined, so that the spectrum of light is provided for simulation. The method disclosed herein for designing two interference filters, each for providing a visible color shifting effect when tilted between first and second viewing angles in the presence of incident light having a spectrum, may include the hue matching step 100, wherein identified parameters of the filters are such that the first and second interference filters match in hue at the first viewing angle, and the first and second interference filters mismatch in hue at the second viewing angle, in both cases when illuminated by light having the same spectrum in the range of 400-700 nm. In the the lightness adjustment step 200, the differences in lightness may be measured or simulated for the modified filters illuminated by light having the same spectrum in the range of 400-700 nm.

In one embodiment of the method, the hue matching step 100 includes identifying two designs of interference filters with the reflector/spacer/absorber structure. The first and second reflector layers may be of a same material, and possibly have a same thickness. The first and second dielectric layers may be of a same material with different thicknesses. The first and second absorber layers may be of a same material and have a same thickness. Thicknesses of the spacer layers may be selected so as to satisfy the hue matching condition at a first viewing angle and to mismatch in hue at a second viewing angle. The lightness adjustment step 200 modifies the designs of the first and second interference filters by changing the thickness of the first or second absorber layer. The resulting modified designs may be used for manufacturing two interference foils or two pluralities of pigment flakes wherein the layers in the foils or flakes have the same materials and thicknesses as in the modified interference filters identified in the lightness matching step 200. The lightness adjustment step 200 reduces the difference in lightness between the two interference filters and results in improved (reduced) difference in color dE*. The difference in color between the so designed pair of interference filters with different thicknesses of the absorber layers H1 and H2 (H1≠H2) is less than the difference in color between another pair of two interference filters, the other pair different from the designed pair only in that both filters in the other pair have equal absorber thicknesses, either H1 or H2 for both filters.

Accordingly, the method allows for designing and manufacturing of a system of interference filters, each for providing a color shifting effect when tilted between first and second viewing angles in the presence of incident light. The system may be a pair of interference lifters, or include more than two filters. A first interference filter in the system includes a first reflector layer, a first absorber layer including a light-absorber material and having a thickness H1, and a first spacer layer between the first reflector layer and the first absorber layer. A second interference filter in the system includes a second reflector layer, a second absorber layer including the light-absorber material and having a thickness H2 different from H1, and a second spacer layer between the second reflector layer and the second absorber layer, wherein an optical thickness of the second spacer layer is different from an optical thickness of the first spacer layer. The first and second interference filters match, in hue, chroma, and lightness at the first viewing angle, and mismatch in hue at the second viewing angle. A difference in color between the first and second interference filters at the first viewing angle is less than a difference in color at the first viewing angle between two interference filters forming a first comparison pair, wherein the two interference filters are different from the first and second interference filters only in that their absorber layers base the thickness H1. The difference in color between the first and second interference filters at the first viewing angle is also less than a difference in color at the first viewing angle between two interference filters forming a second comparison pair, wherein the two interference filters are different from the first and second interference filters only in that their absorber layers have the thickness H2.

By way of examples in the hue matching step 100, a pair of color shifting pigments containing interference filters may be designed to have 6 qw and 4 qw spacer layers optimized for high C*. Physical thicknesses which correspond to the optical thicknesses of 6 qw and 4 qw may be calculated as $d=1.5\lambda/\eta$ and $d=\lambda/\eta$, respectively, wherein $\lambda$ is a design wavelength. The pigments may have the following designs:

C: Cr (9 nm)/MgF2 (546 nm)/Al (60 nm)/MgF2 (546 nm)/Cr (9 nm), and

B: Cr (9 nm)/MgF2 (351 nm)/Al (60 nm)/MgF2 (351 nm)/Cr (9 nm).

The optical parameters of such filters provided by computer simulation are

|   | L* | a* | b* | Hue | C* |
|---|---|---|---|---|---|
| C | 66.4 | −85.5 | 45.4 | 152.1 | 96.8 |
| B | 73.8 | −61.1 | 32.4 | 152 | 69.2 |

The difference in color (dE*) between pigments B and C at the normal angle is 28.6 due to the difference in lightness.

The lightness adjustment step may modify the absorber layer in the design C, resulting in two designs which form a pair matching in hue, chroma, and lightness at the normal viewing angle:

C1: Cr (3.7 nm)/MgF2 (546 nm)/Al (60 nm)/MgF2 (546 nm)/Cr (3.7 nm), and

B: Cr (9 nm)/MgF2 (351 nm)/Al (60 nm)/MgF2 (351 nm)/Cr (9 nm).

The optical parameters of the filter C1 are:

| L* | a* | b* | Hue | C* |
|---|---|---|---|---|
| 74.4 | −61.1 | 32.7 | 151.8 | 69.4. |

The difference in color (dE*) between pigments C1 (modified C) and B at the normal angle is only 0.65. The low difference in color has been achieved, in particular, by using absorber layers of different thickness, 9 nm (H1) and 3.7 nm (H2) in this example, whereas the pair of B and C pigments, both having the absorber layers 9 nm thick (H1), have a higher difference in color at the normal viewing angle, dE*=28.6.

In case both pigments have absorbers 3.7 nm thick (H2), there will be no color match. For modified design B:

B1: Cr (3.7 nm)/MgF2 (351 nm)/Al (60 nm)/MgF2 (351 nm)/Cr (3.7 nm)

The optical parameters are

| L* | a* | b* | Hue | C* |
|---|---|---|---|---|
| 78.4 | −41.3 | 16.3 | 158.5 | 44.4. |

The difference in color (dE*) between pigments B1 (modified B) and C1, both having the absorber layers 3.7 nm (H2) thick, at the normal viewing angle is 26.0.

Accordingly, a system formed of pigments C1 and B, and thus including the corresponding pair of interference filters which have different absorber thicknesses H1 and H2, exhibits a difference in color (0.65) between the first and second interference filters at the first (normal) viewing angle, which is less than a difference in color (28.6) at the first viewing angle between two interference filters (B and C) forming a first comparison pair different from the first and second interference filters only in that absorber layers have the thickness H1 (9 nm), and also is less than a difference in color (26.0) at the first viewing angle between two interference filters (B1 and C1) forming a second comparison pair different from the first and second interference filters only in that absorber layers have the thickness H2 (3.7 nm).

Applying the lightness adjusting step 200 for designing a pair of interference filters that match in hue, chroma, and lightness, results in that the high-performance pair (C1, B) has a difference in lightness at the first viewing angle between the first and second modified filters less than a difference in lightness at the first viewing angle between two interference filters within at least one comparison pair, the pair which has been identified in the hue matching step, the B and C pair in the example above.

The method described above with reference to FIG. 1 may be applied for designing paired interference filters with the absorber/dielectric/absorber structure, each for providing a color shifting effect when tilted between first and second viewing angles in the presence of incident light.

In the generalized form, the hue matching step 300 (FIG. 7), which is a generalization of the step 100, includes identifying layer materials and layer thicknesses for a design of a first interference filter 10 including two first metal layers 12 and 16 and a first spacer layer 14 therebetween, and for a design of a second interference filter 20 including two second metal layers 22 and 26 and a second spacer layer 24 therebetween, wherein the layer materials and layer thicknesses are such that an optical thickness of the first spacer layer is different from an optical thickness of the second spacer layer, and wherein the first and second interference filters match in line at the first viewing angle, and the first and second interference filters mismatch in hue at the second viewing angle.

Figure 7:
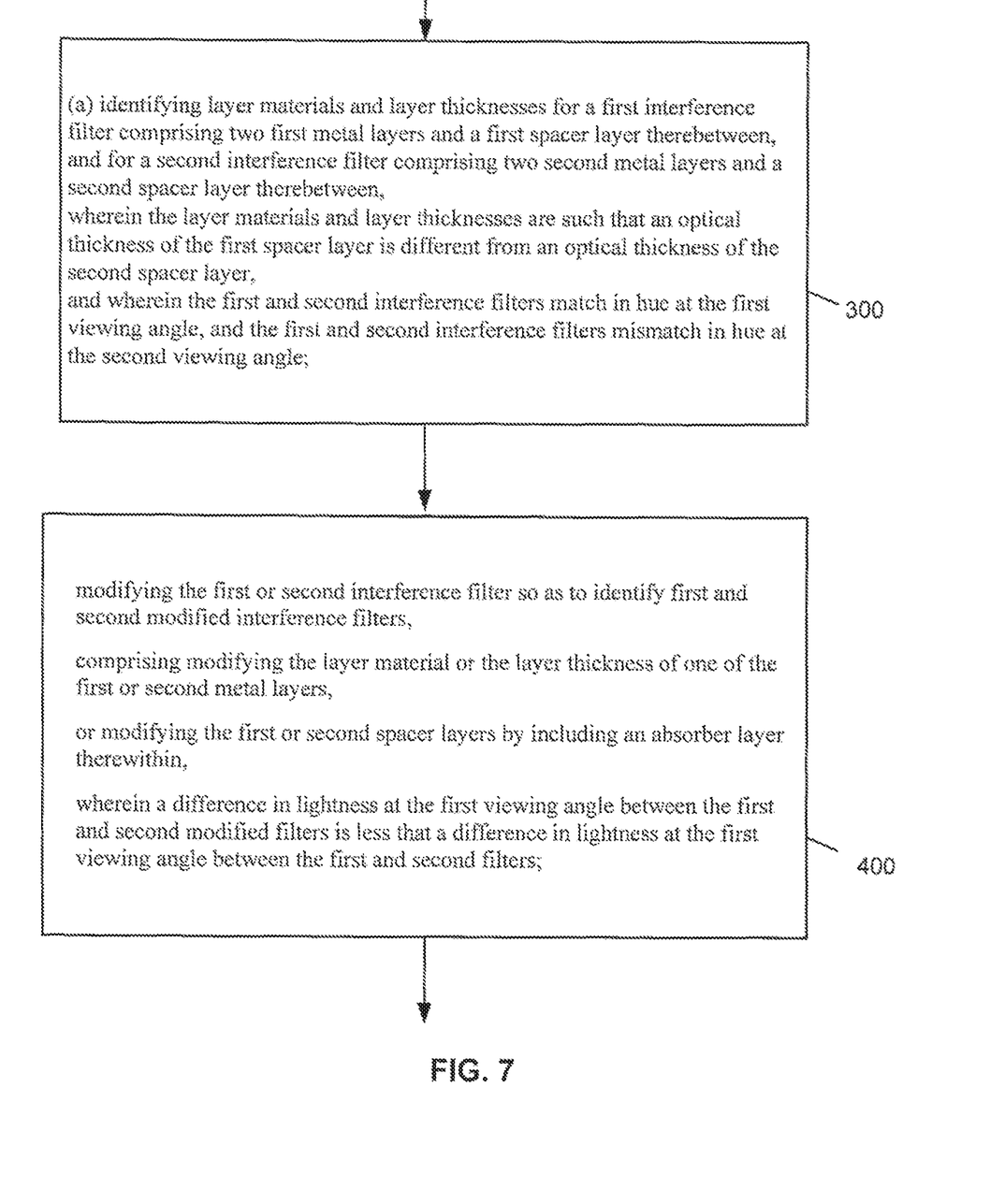
FIG. 7 is a flowchart of the method of designing a system of interference filters; and, FIG. 8 illustrates paired color shifting pigments designed by the method disclosed herein.

The lightness adjustment step 400, which is a generalization of the step 200, then includes modifying the design of first or second interference filter so as to identify designs of first and second modified interference filters, including modifying the layer material or the layer thickness of one of the first or second metal layers, or modifying the first or second spacer layers by including absorber layer therewithin; wherein a difference in lightness at the first viewing angle between the first and second modified filters is less that a difference in lightness at the first viewing angle between the first and second filters.

The resulting design of the system of interference filters includes the first and second modified designs of interference filters.

The two first metal layers may be a reflector layer and an absorber layer and the two second metal layers may also be a reflector layer and an absorber layer, as discussed above with reference to method steps 100 and 200 (FIG. 1). When the two first metal layers are absorber layers and the two second metal layers are also absorber layers, the details discussed above with reference to the method steps 100 and 200 (FIG. 1) are also applicable to the steps 300 and 400 (FIG. 7), wherein the reflector layers 12 and 22 are replaced with absorber layers.

The resulting set of materials and thicknesses may be used for manufacturing of paired pigments of foils, and further their use together in a single device. The two filter designs obtained by the use of the aforedescribed method may be implemented in symmetric color shifting pigments with A1/D1/R1/D1/A1 and A2/D2/R2/D2/A2 structures, respectively. The two filters may also be used in asymmetric color shifting flakes, wherein one side of a flake exhibits a color shift designed as described above, and another of flakes exhibit a metallic color provided by the reflector layer. The two filters may be parts of color shifting foils if on a plastic substrate. The pigments and foils may include other layers adjacent to the interference filters, such as the web substrate in case of a foil, a magnetic layer incorporated within the reflector layer R1 or R2, or between the foil substrate under the reflector layer. The additional layers may be transparent protective layers, etc.

By the sue of the aforedescribed method, a set of two or more optical interference pigments, each differing in optical thickness of the dielectric layers, may be made to match hue angle, chromaticity and lightness at a predetermined viewing angle by configuring the optical coating design in such a way that has minimal impact on color shift performance, for the purpose of maximizing the color difference at other than the matching angle.

The aforedescribed design method allows for a very high level of color match be obtained at one viewing angle, while at the same time retaining a substantial color difference at viewing angles that depart from the matched viewing angle. Both, the quality of the match and the color difference at other than matching angles, determine the optical performance of the feature, so preserving the best contrast at angle is a significant property. The retention of the color contrast at angle is important for practical use.

The method is beneficial for designing pigments for use in intaglio inks because the Chroma levels, which indicate the perceived intensity of colors or saturation, of color shifting pigments as achieved in intaglio are relatively low. However, sets of pigments designed as described herein may be used in priming methods other than intaglio.

In order to match $L^*$, $a^*$ and $b^*$ there are several options for pigments (or films) A and B:

Increase absorber thickness on A, decrease on B;
Increase absorber thickness on both;
Decrease absorber thickness on both;
Increase absorber thickness on A and use blending or stack mismatch on component B;
Decrease absorber thickness on A and use blending or dielectric stack mismatch on B;
Place an intermediate absorber layer within the dielectric layer on A or B, or both components;
Use one of both or the pigments with less than 100% coverage and adjust the pigment loading in the ink (coverage), absorber thickness and background color to achieve a high level of color match;
Use different configurations for the reflector layer(s) of each pigment to adjust, mostly, lightness and chromaticity towards a match.

The last option includes different configurations of potentially asymmetric, reflector layers.

The color match can be configured to be at other than perpendicular viewing angle.

Blending, stack mismatches and otter ways to drive chromaticity, lightness and hue together all may degrade chromaticity at angle and with that shift color contrast between the two pigments.

The design method disclosed herein matches the color matching and does not reduce chromaticity at the change of the viewing angle. Small corrections, important for a match, that do not significantly impact the visual color contrast at angle can be used to adjust, fine-tune, the quality of the match by adjusting the lightness and then possibly hue at the first viewing angle.

One of the advantages of controlling the pigment layers, instead of using ink additives, is that it removes the impact from print quality. The variations in transfer of pigment/ink or in the ink layer thickness are likely to impact both pigments to a similar degree and, therefore, do not impact the color match. The same set of pigments is likely to have a match regardless of the print method/quality.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

We claim:

1. A system comprising:
a first interference filter comprising:
a reflector layer,
the reflector layer including one or more of aluminum, silver, copper, gold, platinum, tin, titanium, palladium, nickel, cobalt, rhodium, niobium, or chromium,
a first absorber layer,
a first dielectric portion,
a second absorber layer,
at least one of the first absorber layer or the second absorber layer including a metal layer,
a reflectivity of the first absorber layer and a reflectivity of the second absorber layer being less than a reflectivity of the reflector layer,
the reflectivity of the reflector layer being at least 40%,
the first absorber layer having a thickness in a range from 5 to 15 nm, and
the first dielectric portion being between the first absorber layer and the second absorber layer, and
a second dielectric portion,
the second absorber layer being between the first dielectric portion and the second dielectric portion, and
the second dielectric portion being between the second absorber layer and the reflector layer; and
a second interference filter,
the first interference filter and the second interference filter appearing to match at a first viewing angle, and
at least one of lightness, color, or hue of the first interference filter at a second viewing angle being different from at least one of lightness, color, or hue of the second interference filter at the second viewing angle.

2. The system of claim 1, where the second interference filter comprises:
a third absorber layer, and
a different reflector layer.

3. The system of claim 2, where the second interference filter further comprises a dielectric layer between the third absorber layer and the different reflector layer.

4. The system of claim 1,
where the first absorber layer has a first thickness, and
where the second interference filter comprises a third absorber layer having a second thickness.

5. The system of claim 1, where the first interference filter and the second interference filter appear to match in hue, chroma, and lightness at the first viewing angle.

6. The system of claim 1, where the first interference filter and the second interference filter have, at the second viewing angle, at least one of:
a difference in hue greater than 10 degrees, or
a difference in chroma greater than 30 units.

7. The system of claim 1, where the system comprises a foil that includes the first interference filter.

8. The system of claim 1, where the first absorber layer comprises a light-absorber material.

9. The system of claim 1, where the metal layer comprises chromium.

10. A system comprising:
a first interference filter comprising:
a first absorber layer,
a dielectric portion,
a second absorber layer,
at least one of the first absorber layer or the second absorber layer including a metal layer, and
a reflector layer,
the reflector layer including one or more of aluminum, silver, copper, gold, platinum, tin, titanium, palladium, nickel, cobalt, rhodium, niobium, or chromium,
the dielectric portion being between the second absorber layer and the reflector layer,
a reflectivity of the first absorber layer and a reflectivity of the second absorber layer being less than a reflectivity of the reflector layer, and
the reflectivity of the reflector layer being at least 40%; and
a second interference filter,
the first interference filter and the second interference filter appearing to match at a first viewing angle,
at least one of lightness, color, or hue of the first interference filter at a second viewing angle being different from at least one of lightness, color, or hue of the second interference filter at the second viewing angle,
the second interference filter being different from the first interference filter, and
the second interference filter comprising a different reflector layer.

11. The system of claim 10,
where the first interference filter further comprises a different dielectric portion, and
where the second absorber layer is between the dielectric portion and the different dielectric portion.

12. The system of claim 10,
where the second viewing angle is different from the first viewing angle by more than 10 degrees.

13. The system of claim 10, where the reflector layer is an opaque layer.

14. An interference filter comprising:
a first absorber layer;
a first dielectric portion;
a second absorber layer,
at least one of the first absorber layer or the second absorber layer including a metal layer, and
the first dielectric portion being between the first absorber layer and the second absorber layer;
a second dielectric portion,
the second absorber layer being between the first dielectric portion and the second dielectric portion; and
a reflector layer,
the second dielectric portion being between the second absorber layer and the reflector layer, the reflector layer including one or more of aluminum, silver, copper, gold, platinum, tin, titanium, palladium, nickel, cobalt, rhodium, niobium, or chromium, the interference filter and a different interference filter appearing to match at a first viewing angle, and at least one of lightness, color, or hue of the interference filter at a second viewing angle being different from at least one of lightness, color, or hue of the different interference filter at the second viewing angle.

15. The interference filter of claim 14, wherein the reflector layer is between 60 to 1000 nm thick.

16. The interference filter of claim 14, wherein the reflectivity of the reflector layer is higher than 60%.

17. The interference filter of claim 14, wherein the first absorber layer and the second absorber layer are metal layers with thicknesses in a range from 5 to 15 nm, and wherein the metal layers include the metal layer.

18. The interference filter of claim 14, wherein the metal layer includes one or more of chromium, aluminum, nickel, silver, copper, palladium, platinum, titanium, vanadium, cobalt, iron, tin, tungsten, molybdenum, rhodium, or niobium.

19. The interference filter of claim 14, further comprising a transparent protective layer that is incorporated within the reflector layer.

20. The interference filter of claim 14, wherein a thickness of the first absorber layer is same as a thickness of the second absorber layer.

* * * * *